Jan. 9, 1962 R. F. REIFERS ETAL 3,016,176
MOLDED PULP EGG CARTON
Filed Sept. 16, 1960 2 Sheets-Sheet 1

INVENTORS
Richard F. Reifers
Harold S. Crane
BY Karl W. Flocks
ATTORNEY

Jan. 9, 1962 R. F. REIFERS ETAL 3,016,176
MOLDED PULP EGG CARTON

Filed Sept. 16, 1960 2 Sheets-Sheet 2

INVENTORS
Richard F. Reifers
Harold S. Crane
BY Karl W. Flocks
ATTORNEY

United States Patent Office 3,016,176
Patented Jan. 9, 1962

3,016,176
MOLDED PULP EGG CARTON
Richard F. Reifers, New Canaan, and Harold S. Crane, Stamford, Conn., assignors to Diamond National Corporation, New York, N.Y., a corporation of Delaware
Filed Sept. 16, 1960, Ser. No. 56,578
12 Claims. (Cl. 229—2.5)

The present invention relates to a molded pulp egg carton, and more particularly to a molded pulp egg carton in which the side walls of the cells are made flexible by incorporating therein thin strips.

This application is a continuation-in-part of application Serial No. 743,338 of Richard F. Reifers and Harold S. Crane filed June 20, 1958, and now abandoned.

Eggs are widely marketed throughout the world in small cartons that hold a dozen eggs each, and among the most widely known type of egg carton is an egg carton that is made of molded pulp. The molded pulp egg carton is produced on known pulp molding machinery in which the carton is formed by sucking fibers from a slurry onto a die of the desired configuration. Thereafter, in order to obtain a carton that is pleasing in appearance and is somewhat softer than the carton otherwise would be, it is pressed between mating pressing dies.

In these known egg cartons, the eggs are held in egg cells, and in general the egg is held up in the cells by the sides of the cell, and these cell sides, made of molded pulp and pressed, are somewhat softer than in previously known cartons, but nevertheless they still retain a considerable degree of hardness. Consequently, when the egg carton with the eggs therein receives a shock, the shock is largely transmitted to the eggs by the walls with which they are in contact and it has been found that this is a factor in the small amount of egg breakage that presently exists.

In addition, in known molded pulp egg cartons, there is some egg movement or egg rattle, and this movement or rattle also contributes to egg breakage and in addition has a deleterious effect on the quality of the egg. This is so because, as has been found, eggs which are subject to rattle do not have as pleasing a taste as eggs that are not thus subjected.

With the prior art egg cartons, also, it is the practice to package eggs of a given size together in one carton, and in order to provide the best possible marketing of eggs, consistent with necessary economies, it is the practice to provide different sizes of cartons for some of the different egg sizes. Despite this, however, it is inescapable that unless selected with far more care than is economically feasible, a dozen eggs that are of the same size insofar as marketing standards are concerned will nevertheless vary, one from another, over a certain limited and acceptable range in weight. It is also known that it is usual for a dozen eggs of the same weight range to vary considerably in their dimensions, which may be referred to as girth and height. Thus, as a result of the variations in the individual egg sizes and weights, it has been found that those eggs which depart from the standard will not be securely and properly held in the egg cells and this results in movement or rattle of these eggs.

Although it has been suggested previously that molded pulp egg cell walls would be made thinner over a larger area than the rest of the cell wall, the method of accomplishment of this is today untaught to the art. Such a construction also suffers from undue weakness, and hence is unacceptable commercially.

It is an object of the present invention to provide a molded pulp egg carton in which egg movement and egg rattle are reduced substantially.

Another object of the present invention is the provision of an egg carton in which the egg cells yieldingly hold and embrace eggs of a relatively wide range of sizes and weight.

Another object of the present invention is to provide a molded pulp egg carton in which the cell side walls are flexible to accept those eggs in the intended size range for a particular carton that depart from the normal size eggs in that range.

A further object of the present invention is the provision of a molded pulp egg carton in which the cells are so formed that they will absorb shocks that are imparted to the carton to thus protect the eggs therein.

A still further object is to provide a molded pulp egg carton that achieves the above objects and that also is relatively easy to mold by known methods and on ordinary equipment.

Other objects and the nature and advantages of the instant invention will be apparent from the following description taken in conjunction with the accompanying drawings, wherein.

Figure 1:
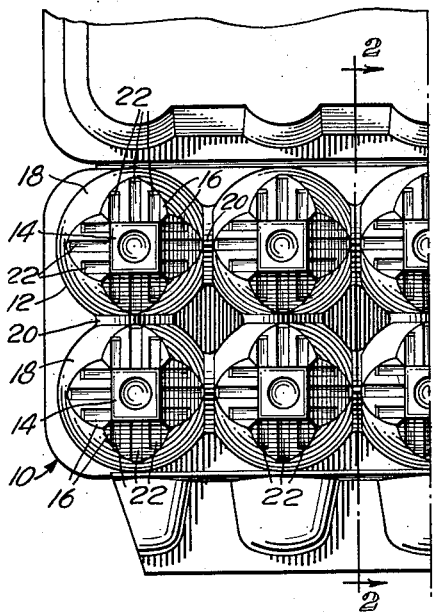
FIG. 1 is a plan view of the exterior of a part of a molded pulp egg carton in accordance with the present invention.

Referring now to the drawings, wherein like reference numerals are used to designate like or corresponding parts throughout the several views, there is shown in FIG. 1 an egg receiving bottom section 10 of a molded pulp egg carton. Bottom section 10 has a plurality of egg receiving cells 12, it being understood that in FIG. 1 the exterior of the cells are shown. The cells 12 are preferably arranged in two rows of six cells each, although an arrangement of three rows of four cells each is also known.

Each of the cells 12 comprises a base 14 that is preferably square and has four upwardly diverging side walls 16 extending therefrom. Above the side walls 16 are conical sections 18.

Figure 2:
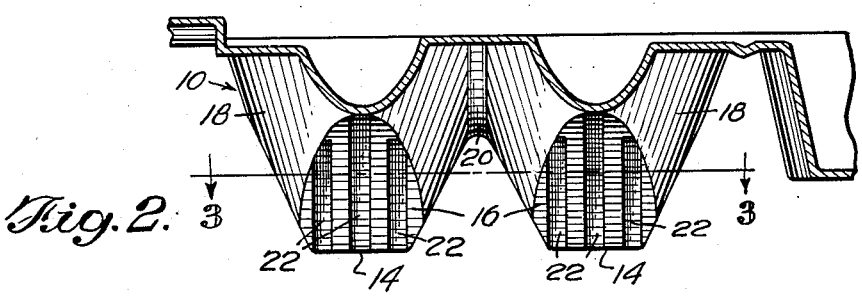
FIG. 2 is a sectional view taken on the line 2—2 of FIG. 1.
Figure 3:
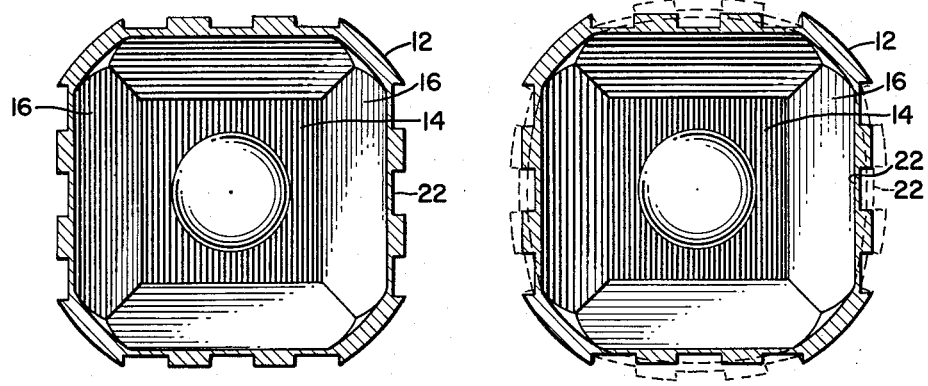
FIG. 3 is a cross-sectional view taken on the line 3—3 of FIG. 2, the dotted lines of the right cell illustrating a yielded configuration.

In FIG. 2, it may be seen that the side walls 16 of adjacent cells converge into a juncture 20. The side walls 16 themselves are provided, in the embodiment of the invention illustrated in FIGS. 1, 2 and 3, with a plurality of parallel elongate strips 22. The strips 22 extend, preferably, in vertical planes as may be seen in FIG. 2, and are relatively thinner than the side walls 16, as is apparent in FIG. 3. The strips 22 extend upwardly from adjacent the cell base 14 to points adjacent the tops of the cell walls 16.

The side wall 16 is securely fastened by its integral joining to the base 14, to its boundary to other side walls and to its boundary with the conical section 18. Thus, it may be seen that side wall 16 of the cell 12 is securely held about its entire periphery. At the midportion thereof, however, it will be seen that the side wall 16 has the thinned strips 22 which in effect cause the side wall 16 to be relatively flexible and yielding. Hence, when an egg is placed in the cell 12, and particularly an egg that is larger in girth or in weight than the normal for the range of sizes for which the particular egg carton has been made, the side 16 will yield or "give" to yieldingly hold and embrace the egg. Otherwise stated, the side walls 16 will flex due to the presence of the strips 22 to accommodate the larger girth or weight egg. Also, it will be understood that with the egg thus yieldingly held and embraced, there will be less egg movement and rattle, thus reducing egg breakage and deterioration of egg quality. Should the egg carton of the present invention receive a shock, as when it is being handled or transported in the marketing process, the sides 16 will act as shock absorbers and thus the force of the shock will be greatly diminished before being transferred to the egg held in the cell 12.

Figure 4:
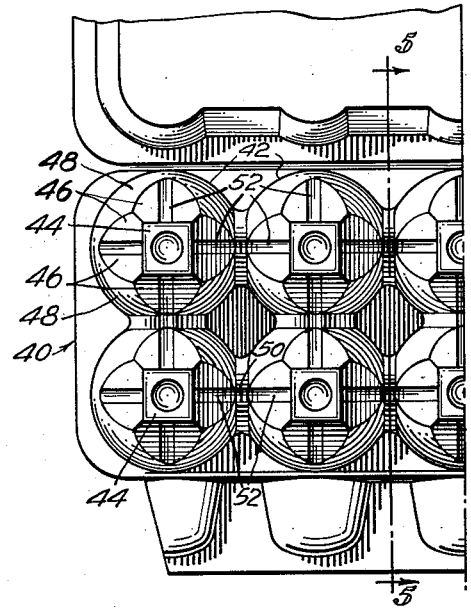
FIG. 4 is a view similar to FIG. 1 and showing another embodiment of the present invention.

In FIG. 4 there is shown an egg receiving section 40 of a molded pulp egg carton, section 40 having a plurality of egg receiving cells 42 that are in aligned rows of four or six cells each as above noted. Each cell 42 has the general configuration of the cell 12 of section 10 shown in FIG. 1, and may be seen to comprise the square base 44 having four upwardly diverging side walls 46 extending therefrom and integrally molded thereto. Above the side walls 46 is the conical section 48.

Figure 5:
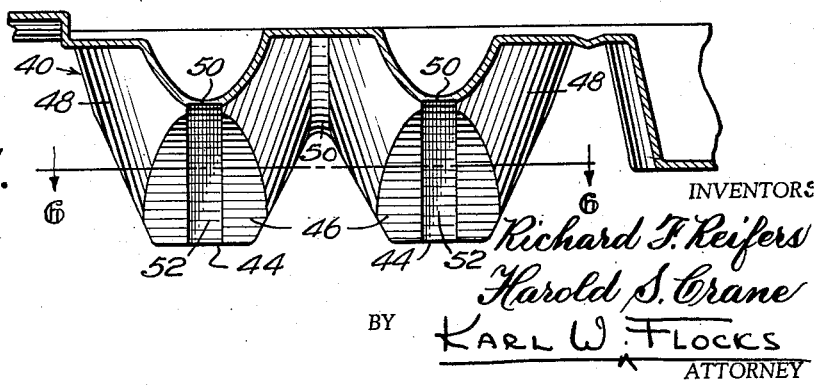
FIG. 5 is a sectional view taken on the line 5—5 of FIG. 4.
Figure 6:
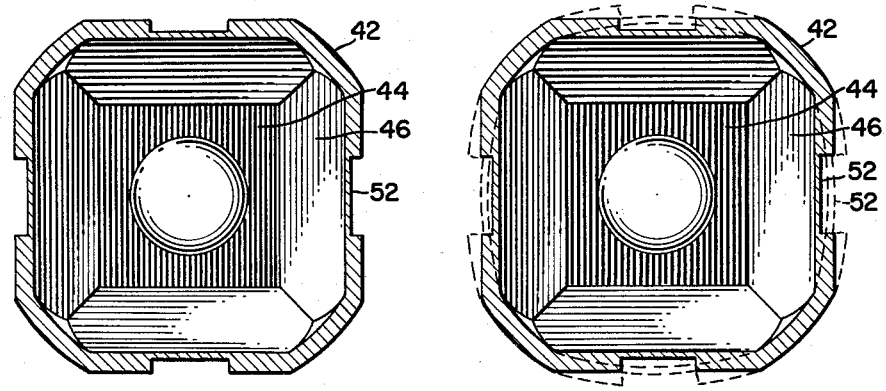
FIG. 6 is a cross-sectional view taken on the line 6—6 of FIG. 5, the dotted lines of the right cell illustrating a yielded configuration.

It will be noted that the aligned cells 42 of egg receiving section 40 have, see FIG. 5, their adjacent side walls 46 converging to a juncture 50. The juncture 50 is V-shaped as may readily be seen in FIG. 5. Each side wall 46 has in the outer surface thereof an elongate strip 52 that is relatively thinner than the side wall 46, as may be seen from FIG. 6. The two strips 52 of adjacent side walls 46 are preferably joined at the juncture 50, so that in effect the two strips 52 form one continuous strip, as is seen in FIG. 4.

Because the egg receiving section 40 is an integral molded pulp article, the side walls 46 of the cells 42 are integrally joined to the cell base 44, to the other side walls 46 and to the conical portion 48, and hence it may be seen that side walls 46 are securely held about their periphery. The thinned strip 52 gives to the side wall 46, however, a greatly and markedly increased yieldability and flexibility, so that it also yieldingly embraces and holds an egg placed therein, and particularly an egg of larger weight or girth. Hence, the eggs held in cells 42 are subjected to much less movement and rattle as the side walls 46 will yield or flex to receive and hold them. Also, as with cell 12, the cell 42 provides for the absorption of shocks that may be imparted to the carton and thus greatly diminishes the transmission of these shocks to the egg held in the cell.

The thin strips 22 and 52 may be readily formed in the sections 10 and 40 during the initial molding of these sections by either changing the configuration of the molding dies or by providing the necessary blocking bars thereon, both procedures being understood by those skilled in the art. In the case of section 40, the strips 52 may result from a continuous blocking bar or changed configuration extending from the side wall 46 of one cell over to the side wall 46 of the adjacent cell 42.

As above stated, the thin strips 22 and 52 may be readily formed in the sections 10 and 40 during the initial molding of these sections by providing the necessary blocking bars on the molds so that these thin strips will consist of undisturbed molded pulp fibers even after the egg carton surface on each side of said strips is pressed between mating pressing dies, as stated in the third paragraph of this specification. These elongated thin strips 22 and 52 are composed of molded fibers which are oriented into positions normal to pulp molding but the pressed areas on each side of said thin strips have compressed fibers so that the latter are at variance to the orientation of the normally molded pulp fibers within the thin strips. In the molded pulp egg carton of the construction herein described, the original orientation or deposited condition of the fibers is not disturbed in the thin strip areas because the pressing or ironing on the surface of the article is such that the thin strips are "bridged" by the pressing dies.

It will be seen that there has been provided a readily manufactured molded pulp egg receiving section for an egg carton in which the cells flex to yieldingly hold and embrace the eggs held therein, and this is particularly so of larger or heavier eggs. There results with the cartons of the present invention less egg movement and rattle, and consequently less egg breakage, as well as superior absorption of shock by the carton.

It will be obvious to those skilled in the art that various changes may be made without departing from the spirit of the invention and therefore the invention is not limited to what is shown in the drawings and described in the specification but only as indicated in the appended claims.

What is claimed is:

1. In a molded pulp egg carton, an egg receiving section having a plurality of egg receiving cells each comprising a square base and four upwardly diverging side walls extending therefrom, said side walls each having in the outer surface thereof a plurality of parallel elongate strips extending in vertical planes, said strips being relatively thinner than the said side walls and extending from adjacent the cell base upwardly to points adjacent the tops of said cell walls.

2. In a molded pulp egg carton, an egg receiving section having a plurality of egg receiving cells each comprising a base and upwardly diverging side walls extending therefrom, said side walls each having in the outer surface thereof a plurality of parallel elongate strips extending in vertical planes, said strips being relatively thinner than the said side walls and extending from adjacent the cell base upwardly to points adjacent the tops of said cell walls.

3. In a molded pulp egg carton, an egg receiving section having a plurality of egg receiving cells each comprising a base and upwardly diverging side walls extending therefrom, said side walls each having a plurality of parallel elongate strips extending in vertical planes, said strips being relatively thinner than the said side walls, and extending from adjacent the cell base upwardly to points adjacent the tops of said cell walls.

4. In a molded pulp egg carton, an egg receiving section having a plurality of egg receiving cells each comprising a base and upwardly diverging side walls extending therefrom, said side walls each having in the outer surface thereof a plurality of parallel elongate strips, said strips being relatively thinner than the said side walls.

5. In a molded pulp egg carton, an egg receiving section having a plurality of egg receiving cells each comprising a base and upwardly diverging side walls extending therefrom, said side walls each having in the outer surface thereof a plurality of elongate strips, said strips being relatively thinner than the said side walls.

6. In a molded pulp egg carton, an egg receiving section having a plurality of egg receiving cells each comprising a base and upwardly diverging side walls extending therefrom, said side walls each having a plurality of elongate strips therein, said strips being relatively thinner than the said side walls.

7. In a molded pulp egg carton, an egg receiving section having a plurality of egg receiving cells comprising a square base and four upwardly diverging side walls extending therefrom, each said side wall having in the outer surface thereof an elongate strip that is relatively thinner than the said side wall, two of said cells being aligned and the side walls of adjacent cells meeting at a V-shaped juncture, the strips of adjacent cells extending continuously from the base of one cell to the juncture and thence to the base of the adjacent cell.

8. In a molded pulp egg carton, an egg receiving section having a plurality of egg receiving cells comprising a base and upwardly diverging side walls extending therefrom, each said side wall having in the outer surface thereof an elongate strip that is relatively thinner than the said side wall, two of said cells being aligned and the side walls of adjacent cells meeting at a V-shaped juncture, the strips of adjacent cells extending continuously from the base of one cell to the juncture and thence to the base of the adjacent cell.

9. In a molded pulp egg carton, an egg receiving section having a plurality of egg receiving cells comprising a base and upwardly diverging side walls extending therefrom, each said side wall having an elongate strip that is relatively thinner than the said side wall, two of said cells being aligned and the side walls of adjacent cells meeting at a V-shaped juncture, the strips of adjacent cells extending continuously from the base of one cell to the juncture and thence to the base of the adjacent cell.

10. In a molded pulp egg carton, an egg receiving section having a plurality of egg receiving cells comprising a base and upwardly diverging side walls extending therefrom, each said side wall having in the outer surface thereof an elongate strip extending in a vertical plane, said strip being relatively thinner than the said side wall, said strip consisting of undisturbed molded pulp fibers, the egg carton surface on each side of said strip being pressed.

11. In a molded pulp egg carton, an egg receiving section having a plurality of egg receiving cells comprising a base and upwardly diverging side walls extending therefrom, each said side wall having an elongate strip extending in a vertical plane and being relatively thinner than the said side wall, said strip consisting of undisturbed molded pulp fibers, the egg carton surface on each side of said strip being pressed.

12. In a molded pulp egg carton, an egg receiving section having a plurality of egg receiving cells comprising a base and upwardly diverging side walls extending therefrom, at least one of said side walls having in the outer surface thereof elongate strip means relatively thinner than the said side wall, said elongate thin strip means being composed of molded fibers which are oriented into positions normal to pulp molding, the egg carton areas immediately adjacent said strip means being pressed, said strip means extending in a vertical plane passing transversely therethrough.

References Cited in the file of this patent

UNITED STATES PATENTS

| | | |
|---|---|---|
| 1,850,584 | Gray | Mar. 2, 1932 |
| 2,560,847 | Chaplin | July 17, 1951 |